Aug. 12, 1947.    P. D. SULOFF    2,425,575
BELT
Filed Jan. 15, 1943
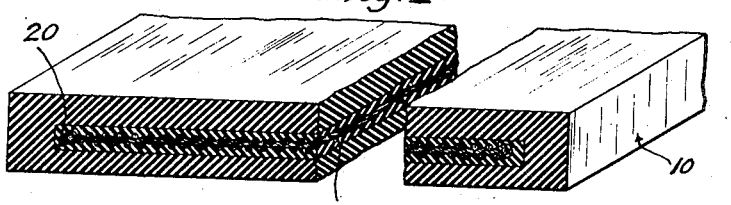
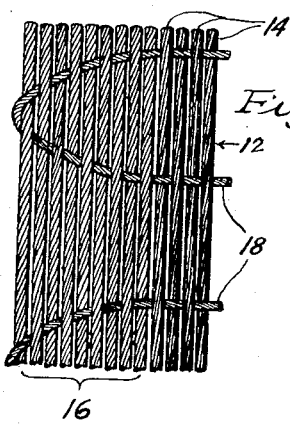
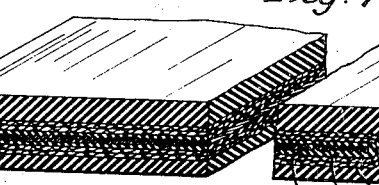
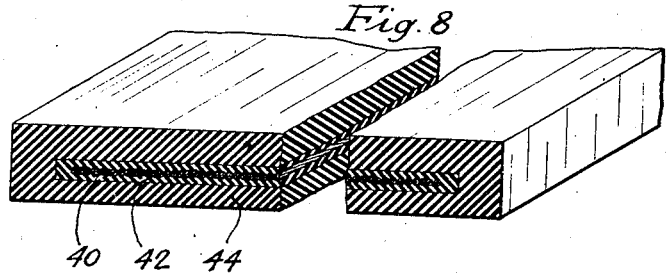
Inventor
Paul D. Suloff
By
Attorney Patented Aug. 12, 1947

2,425,575

UNITED STATES PATENT OFFICE 2,425,575

BELT

Paul D. Suloff, Akron, Ohio, assignor to Wingfoot Corporation, Akron, Ohio, a corporation of Delaware Application January 15, 1943, Serial No. 472,455

4 Claims. (Cl. 74—237)

This invention relates to belts, and, more particularly, to drive and conveyor belts made of rubber and rubber material reinforced by load-carrying members.

Heretofore, it has been the standard practice to make flat rubber drive belts, and rubber conveyor belts, from a rubber body reinforced with fabric cords and/or a rubberized fabric. However, in belts of this type it has been necessary to provide take-up means in the mounting pulleys particularly on conveyor belt installations, because the belts have been subject to change in the length as a result of change in moisture content. For example, cotton reinforced belts shrink when used in wet locations and often cause trouble for this reason. Moreover, in employing cotton-reinforced belts for conveyors it is often necessary to build up the cotton-reinforcing means so that the belt becomes so bulky and so lacking in both longitudinal and transverse flexibility it is not practical to bend the conveyor belt around normal-sized head and tail pulleys.

It has been proposed in the past to reinforce leather belts with metal load-carrying means. However, metal load-carrying means have never been employed, so far as is known, in conjunction with rubber-bodied belts. Apparently this has been due to the difficulty of properly adhering the metal reinforcing means to the rubber belt body, and to the known fact that metal reinforcing means are difficult to position and adjust to achieve uniform tension between the several load-carrying means, and to the difficulty of preventing the metal reinforcing means from cutting into the rubber body with an attendant failure of the belt.

It is the general object of this invention to avoid and overcome the foregoing and other difficulties of and objections to prior art practices by the provision of an improved rubber belt of the conveyor or drive type reinforced by flexible steel cables.

Another object of the invention is the provision of an improved rubber belt reinforced with flexible steel cable means coated with adhesive and a relatively stiff layer of rubber so as to bond positively and in non-cutting relation with the rubber body of the belt.

Another object of the invention is to provide an improved conveyor belt or flat drive belt having a rubber body reinforced with longitudinally-extending warp-forming flexible steel cables and having associated means for controlling the resiliency thereof.

Another object of the invention is the provision of a rubber belt of the drive or conveyor type including a reinforcing woven member having fabric warp cord selvages and flexible metallic cable warp cords and fabric weft cords tensioned to form undulations in the warp cords.

Another object of the invention is the provision of rubberized belts including metallic load-carrying means, and means for laterally tying together the metallic members.

For a better understanding of the invention, reference should be had to the accompanying drawings, wherein Fig. 1 is a perspective view, partly in transverse and longitudinal section, of a flat drive or a conveyor belt embodying principles of the invention; Fig. 2 is a transverse sectional view through one of the flexible cables incorporated in the belt of Fig. 1; Fig. 3 is a view similar to Fig. 2 but illustrating a modified form of cable; Fig. 4 is an enlarged view of the reinforcing means shown in transverse section in Fig. 1; Fig. 5 is a fragmentary view in longitudinal section of the reinforcing means; Fig. 6 is a view in plan of the reinforcing means or fabric incorporated in the belt shown in Fig. 1; Fig. 7 is a view similar to Fig. 1 but illustrates another embodiment of the invention; and Fig. 8 is a view similar to Figs. 1 and 7 but illustrates still another form of the invention.

The form of the invention illustrated in Fig. 1 of the drawings comprises a wide flat conveyor belt having a body portion 10 of rubber or rubber material. The term "rubber material," as employed throughout the specification and claims, is intended to cover natural or synthetic rubbers compounded in any suitable way and employed in conjunction with reinforcing fabric or other known means, and the term "rubber" is intended to cover in the specification and claims any rubber of natural or synthetic composition and compounded with any known chemicals, but not including reinforcing fabric or other reinforcing means. The body 10 has embedded therein a reinforcing member indicated as a whole by the numeral 12. The member 12 comprises warp members 14 which are made of flexible steel or other strong flexible load-carrying metal. The cables 14, as best seen in Figs. 2 and 3, are preferably made up from seven groups of three strands each (Fig. 2), or from three groups of seven strands each (Fig. 3). Other groups of flexible strands may be employed, but it has been found advantageous to use one or the other of the groups shown in Figs. 2 and 3. The overall diameter of the cables shown in Figs. 2 and 3, employed in the woven member 12, is usually kept within the practical range of ¾₂ of an inch diameter to ¼ of an inch diameter, depending upon the operating tension of the conveyor belt, the pulley diameters with which the belt is used and the frequency of flexing. Each individual wire or strand of each cable is conveniently of a diameter of about .006 inch, and this diameter may be increased up to about .012 inch diameter for heavy load conditions.

The warp cables 14 preferably do not extend entirely to the edges of the woven member, but the edges or selvages of the woven member comprise cotton or other textile warp cords indicated by the numeral 16. This is particularly shown in Fig. 6. Holding the warp cords 16 and the warp cables 14 together as a woven member are textile weft cords 18 which are positioned farther apart in a longitudinal direction than are the warp cords in a lateral direction, so that the weft cords 18, when tightened with considerable tension during the weaving operation, throw undulations into the warp cords in the manner best seen in Fig. 5. This provides a resiliency in the warp cords, because the undulations will tend to straighten out against the action of the weft cords, and such resiliency would not be present if the warp cords were employed without the tight weft cords. Of course, the tightness and the frequency of the weft cords determine the undulations in the warp cords and their resiliency.

The woven member 12 has each one of the cables 14 brass plated prior to being formed into the woven member, and over the individual cables or over the entire woven member 12 is placed a thin coating of a suitable air-excluding resin and/or a rubber adhesive for coating the woven member or the cables 14 so that the cables or woven member will be protected from the air after plating and/or will be better adapted to securely unite with rubber positioned around the woven member. Completely surrounding and enclosing the woven member 12 is a body of rubber indicated by the numeral 20 in Fig. 1. The rubber 20 is of a composition which is relatively stiff, namely, of a composition stiffer than the tread or other stock composition normally employed to form the rubber body 10 of the belt. The rubber body 20 is made stiffer than the stock of the body 10, so that each individual wire cable 14 is not only held by the weft textile cords 18 but is also closely surrounded, embedded in, and supported by the rubber of the body 20. When the rubber body 20 is of stiffer character than the body 10, the danger that the wire cables 14 may cut into and/or through the rubber body 20 and body 10 is substantially eliminated. The stiffness of the rubber is, in general, a measure of its ability to resist shearing action and also, in general, indicates the relative hardness of the material.

The embodiment of the invention illustrated in Fig. 7 is, in general, similar to that already described in detail above, and illustrated in Figs. 1 to 6. In Fig. 7, the numeral 30 indicates a layer of flexible steel cables of the type already described, and positioned side by side either in the form of long single cables, or wound as a helical convolution if the belt is endless. The cables 30 are brass-plated, coated with a resin and/or an adhesive as above set forth, and are surrounded by a body 32 of rubber of a composition stiffer than normal tire tread stock, whereby the cables 30 are firmly held against cutting action with respect to the rubber body of the belt. Surrounding the rubber body 32 are one or more turns, usually at least two, of rubberized fabric 34 which is generally cut on the bias to facilitate flexing. Entirely enclosing and surrounding the rubberized fabric 34 is an envelop 36 of rubber or rubber material. In this embodiment of the invention the weft cords have been eliminated, as have the textile cord selvages, but it should be particularly understood that either one or both of these may be incorporated with the belt structure of Fig. 7.

The form of the invention shown in Fig. 8 is similar to that illustrated in Fig. 7, except that the rubberized fabric 34 is eliminated from the construction of Fig. 8. Briefly, the belt of Fig. 8 includes flexible metallic cables 40 wound as a helical convolution, or as individual longitudinally-extending cables with the cables being suitably plated, coated with a resin and/or an adhesive, and surrounded by rubber body 42, and in turn by an envelope of rubber or rubber material 44.

It will be recognized that the various objects of the invention have been achieved by the provision of improved drive and conveyor belts. The improved belts have been found to possess materially increased life even under very severe operating conditions, and it is possible to materially reduce the weight, thickness and cost of, for example, a conveyor or a drive belt, and to carry driving and conveyor loads heretofore thought impossible. The improved belts are capable of being built to have any desired longitudinal resiliency by control of the weft textile cords, and, with proper construction, stretch or shrinkage of the belts under operating conditions is unknown.

Although in accordance with the Patent Statutes, the invention has been specifically illustrated and described, nevertheless, the invention is not to be limited thereto or thereby, but is defined in the appended claims.

What I claim is:

1. A drive or conveyor belt comprising a body portion of rubber material, a longitudinally-extending load-carrying layer of flexible steel cables embedded in the body portion, longitudinally-extending load-carrying textile cords positioned at the edges of the layer of steel cables, and transversely-extending fabric weft cords tying together the layer of cables and longitudinally-extending cords.

2. A rubber belt assembly comprising a longitudinally-extending layer of load-carrying flexible steel cables, each cable having at least twenty-one strands, laterally-extending weft cords in the layer of cables stretched with sufficient tension to hold the cables undulated, brass plating on said cables, a resin coating over the brass plating, a body of extra stiff rubber over the resin coating and surrounding the layer, an envelope of rubberized fabric over the body of extra stiff rubber, and a surrounding layer of softer rubber having greater wear resistance than the body of extra stiff rubber.

3. A drive or conveyor belt comprising a body portion of rubber material, a longitudinally-extending load-carrying layer of flexible steel cables embedded in the body portion, and longitudinally-extending load-carrying textile cords posinally-extending load-carrying textile cords positioned at the edges of the layer of steel cables.

4. A drive or conveyor belt comprising a body portion of rubber material, a longitudinally-extending, load-carrying layer of flexible steel cables embedded in the body portion, and longitudinally-extending, load-carrying textile cords positioned at the edges of the layer of steel cables, the rubber body portion comprising a layer of relatively stiff rubber embracing the steel cables and textile cords and an outer wear-resisting layer surrounding said first layer and being of a relatively lesser stiffness.

PAUL D. SULOFF.

REFERENCES CITED

The following references are of record in the file of this patent:

UNITED STATES PATENTS

| Number | Name | Date |
| --- | --- | --- |
| 2,031,720 | Lee et al. | Feb. 25, 1936 |
| 66,111 | White et al. | June 25, 1867 |
| 204,368 | Petchell | May 28, 1878 |
| 993,031 | Coleman | May 23, 1911 |
| 1,573,390 | Gessner | Feb. 16, 1926 |
| 2,290,386 | Schindler | July 21, 1942 |
| 1,420,962 | Breuer | June 27, 1922 |
| 1,201,257 | Cobb | Oct. 17, 1916 |
| 1,207,853 | Burrell | Dec. 12, 1916 |
| 1,813,876 | Gerstenslager | July 7, 1931 |
| 1,988,292 | Yelm | Jan. 5, 1935 |
| 2,114,517 | Apel et al. | Apr. 19, 1938 |
| 2,186,776 | Webb et al. | Jan. 9, 1940 |
| 1,457,892 | Blackwelder | June 5, 1923 |
| 1,977,108 | Arnberg | Oct. 16, 1934 |
| 2,326,719 | Myers | Aug. 10, 1943 |
| 2,251,400 | Colley | Aug. 5, 1941 |
| 2,064,781 | Collins | Dec. 15, 1936 |
| 2,257,647 | Pierce | Sept. 30, 1941 |
| 2,294,821 | Yelm | Sept. 1, 1942 |

FOREIGN PATENTS

| Number | Country | Date |
| --- | --- | --- |
| 529,565 | France | Sept. 12, 1921 |
| 217,644 | Great Britain | June 19, 1924 |
| 335,357 | France | Jan. 22, 1904 |